(12) United States Patent
Anderson

(10) Patent No.: US 11,178,816 B2
(45) Date of Patent: Nov. 23, 2021

(54) QUICK REMOVE DRIVE-OVER MOWER DECK RAMPS

(71) Applicant: DEERE & COMPANY, Moline, IL (US)

(72) Inventor: Maxwell Anderson, Hartford, WI (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/284,849

(22) Filed: Feb. 25, 2019

(65) Prior Publication Data
US 2020/0267898 A1 Aug. 27, 2020

(51) Int. Cl.
| | | |
|---|---|---|
| *A01D 34/81* | (2006.01) | |
| *A01D 34/66* | (2006.01) | |
| *B66F 7/24* | (2006.01) | |
| *A01D 101/00* | (2006.01) | |

(52) U.S. Cl.
CPC .............. *A01D 34/81* (2013.01); *B66F 7/243* (2013.01); *A01D 34/66* (2013.01); *A01D 2101/00* (2013.01)

(58) Field of Classification Search
CPC .. A01D 34/81; A01D 34/71; A01D 2034/645; A01D 34/64; A01D 34/001; A01D 34/66; A01D 34/661; A01D 2101/00; B66F 7/243; B66F 7/247
See application file for complete search history.

(56) References Cited

U.S. PATENT DOCUMENTS

| | | | | |
|---|---|---|---|---|
| 5,176,361 | A * | 1/1993 | Ayala, III | B66F 7/243 |
| | | | | 254/88 |
| 7,003,836 | B2 * | 2/2006 | Berg | B66F 7/243 |
| | | | | 14/69.5 |
| D531,568 | S * | 11/2006 | Davidian | D12/217 |
| 7,222,838 | B1 * | 5/2007 | Ji | B66F 7/243 |
| | | | | 254/88 |
| 7,240,470 | B2 | 7/2007 | Clement et al. | |
| 7,685,800 | B2 | 3/2010 | Sugio et al. | |
| 7,735,305 | B1 | 6/2010 | Cozine et al. | |
| 7,877,972 | B2 | 2/2011 | Fox et al. | |
| 7,905,297 | B2 | 3/2011 | Fox et al. | |
| 8,234,847 | B2 | 8/2012 | Fox et al. | |
| 8,336,281 | B2 * | 12/2012 | Sugio | A01D 34/82 |
| | | | | 56/320.1 |
| 8,720,173 | B2 | 5/2014 | Sugio et al. | |
| 8,763,355 | B2 | 7/2014 | Sugio | |
| 9,622,406 | B2 | 4/2017 | Tada et al. | |
| 9,699,962 | B2 * | 7/2017 | Akita | A01D 34/81 |
| 9,699,966 | B2 * | 7/2017 | Shaver | A01D 34/828 |
| 2007/0028577 | A1 * | 2/2007 | Clement | A01D 34/64 |
| | | | | 56/17.2 |
| 2016/0183454 | A1 * | 6/2016 | Akita | A01D 34/661 |
| | | | | 56/320.1 |

\* cited by examiner

*Primary Examiner* — Alicia Torres
*Assistant Examiner* — Madeline Ivy Runco

(57) ABSTRACT

A quick remove drive-over mower deck ramp includes plastic body having a first end, a second end and a center portion extending over a pulley and belt on a multi-blade mower deck. The ramp has a rear incline and a front incline, each incline sloping upwardly from one end of the ramp toward the center portion. A first end of the ramp engages a cleat while the ramp is against the mower deck, and disengages the cleat while the ramp is pivoted away from the mower deck.

8 Claims, 5 Drawing Sheets

QUICK REMOVE DRIVE-OVER MOWER DECK RAMPS

FIELD OF THE INVENTION

This invention relates generally to rotary mower decks carried by tractors or other vehicles. More specifically, the invention relates to drive-over mower deck ramps for multi-blade rotary mower decks.

BACKGROUND OF THE INVENTION

Rotary mower decks carried by tractors or other vehicles may have drive-over mower deck ramps to help reduce the time and effort required to install or remove a mid-mounted mower deck from under the tractor or vehicle.

For example, U.S. Pat. No. 7,240,470 for Drive over mower deck, assigned to Deere & Company, relates to drive-over belt shields mounted to the top surface of the deck to protect belts, pulleys, or other working components of the deck, from the weight of a tractor, including the tractor tires while driving over the deck. The drive-over belt shields help distribute the weight of the tractor or vehicle to the outer edges of the deck where the deck may provide the most strength, especially if the deck is made of lighter weight steel. The drive-over belt shields also may be fastened to the deck in a manner that allows their removal for servicing working components on the deck. For example, the drive-over belt shields may have access holes to provide for application of grease or oil to service the pulleys and other components under the shields. Additionally, a pair of front cleats may project forwardly from the front and/or rear edge or rim of the deck, to engage the tires of a tractor before the tires contact the rim or top surface of the mower deck. The cleats help hold and secure the deck in a stationary position on the ground surface while the tractor begins to drive over the mower deck, or drive off from the mower deck. The cleats help prevent the mower deck from sliding forward when a tractor drives over it. Other examples are provided in U.S. Pat. Nos. 7,685,800, 8,336,281 and 8,720,173, for Climb-up assist structure for mower unit.

Mower decks also may have one or more spindle covers attached to the top surface of a mower deck, to protect pulleys on the upper ends of the spindles and improve safety. It is desirable to periodically remove the spindle covers to perform service and maintenance work on the mower deck. This work may include cleaning out grass clippings and debris that collects in the spindle pockets, greasing the spindle bearings, and removing or replacing the belt. A wrench or socket may be used to loosen and disconnect the threaded fasteners or other hardware connecting each spindle cover to the mower deck. To provide better access to each spindle pocket without tools or fasteners, U.S. Pat. No. 9,699,966 for Quick remove drive-over mower deck ramp, assigned to Deere & Company, provides a spindle cover that pivots between lowered and raised positions. Other examples of removable spindle covers are shown in U.S. Pat. No. 7,735,305 for Removable cover and implement incorporating same, and U.S. Pat. No. 8,763,355 for Mower unit utilizing removably attached pulley cover.

There is a need for a drive-over mower deck ramp that may be easily and quickly removed or installed without tools. There is a need for a drive-over mower deck ramp that is low cost and light weight, but with strength to support a tractor or other vehicle having a weight of at least about 450 pounds. There is a need for a drive-over mower deck ramp that provides good traction for tires of a tractor or other vehicle.

SUMMARY OF THE INVENTION

A quick remove drive-over mower deck ramp includes a light weight plastic body that may be easily and quickly removed from the top surface of a mower deck. The plastic body supports a vehicle tire above at least one pulley mounted to the mower deck. The plastic body has a front incline and a rear incline. Each incline may have a plurality of tire gripping features. The plastic body is removable without tools from the mower deck by manually disengaging a first end of the plastic body and pivoting the plastic body relative to the mower deck.

DESCRIPTION OF THE PREFERRED EMBODIMENT

Figure 1:
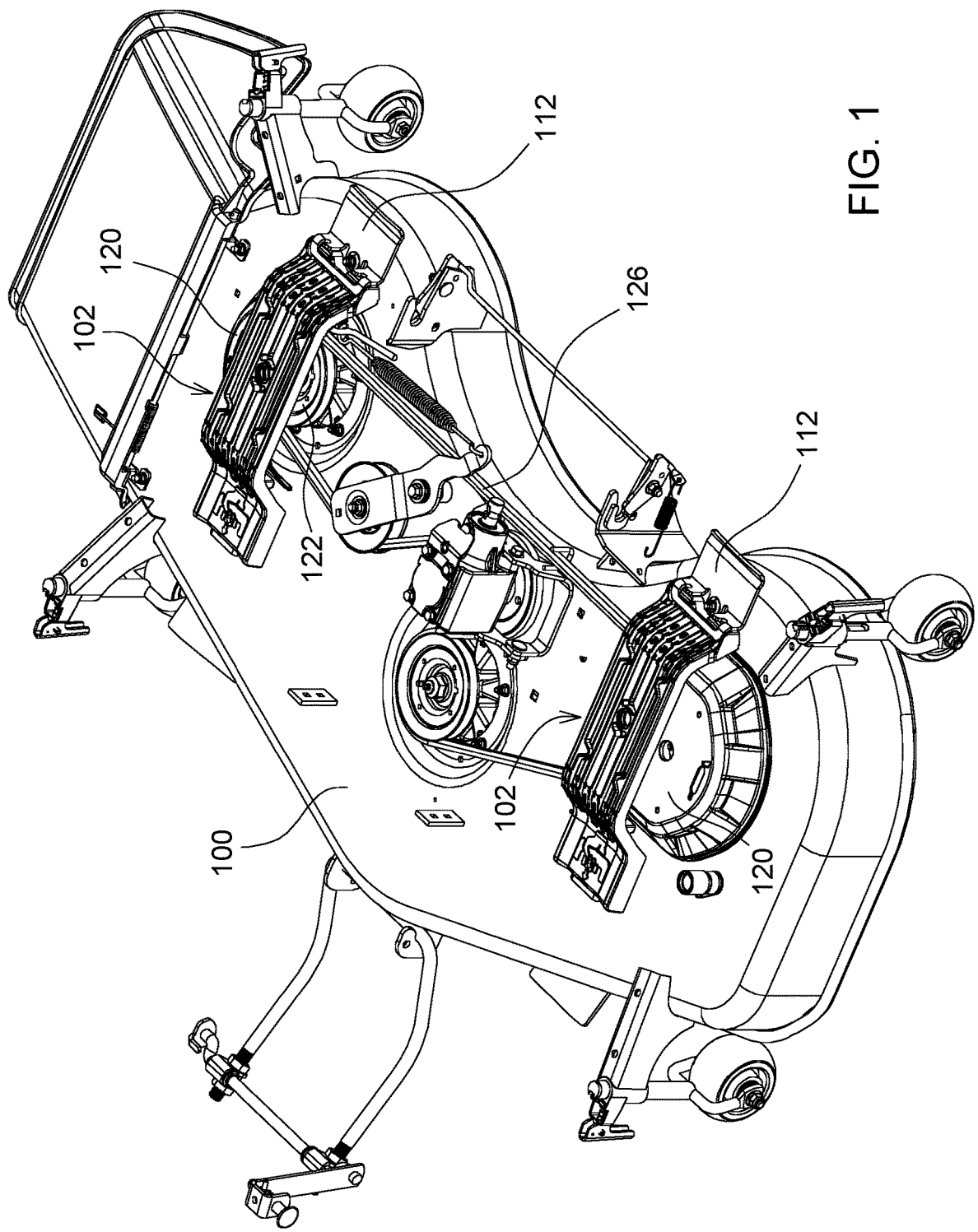
FIG. 1 is a top perspective view of a mower deck having a pair of quick remove drive-over mower deck ramps according to an embodiment of the invention.
Figure 2:
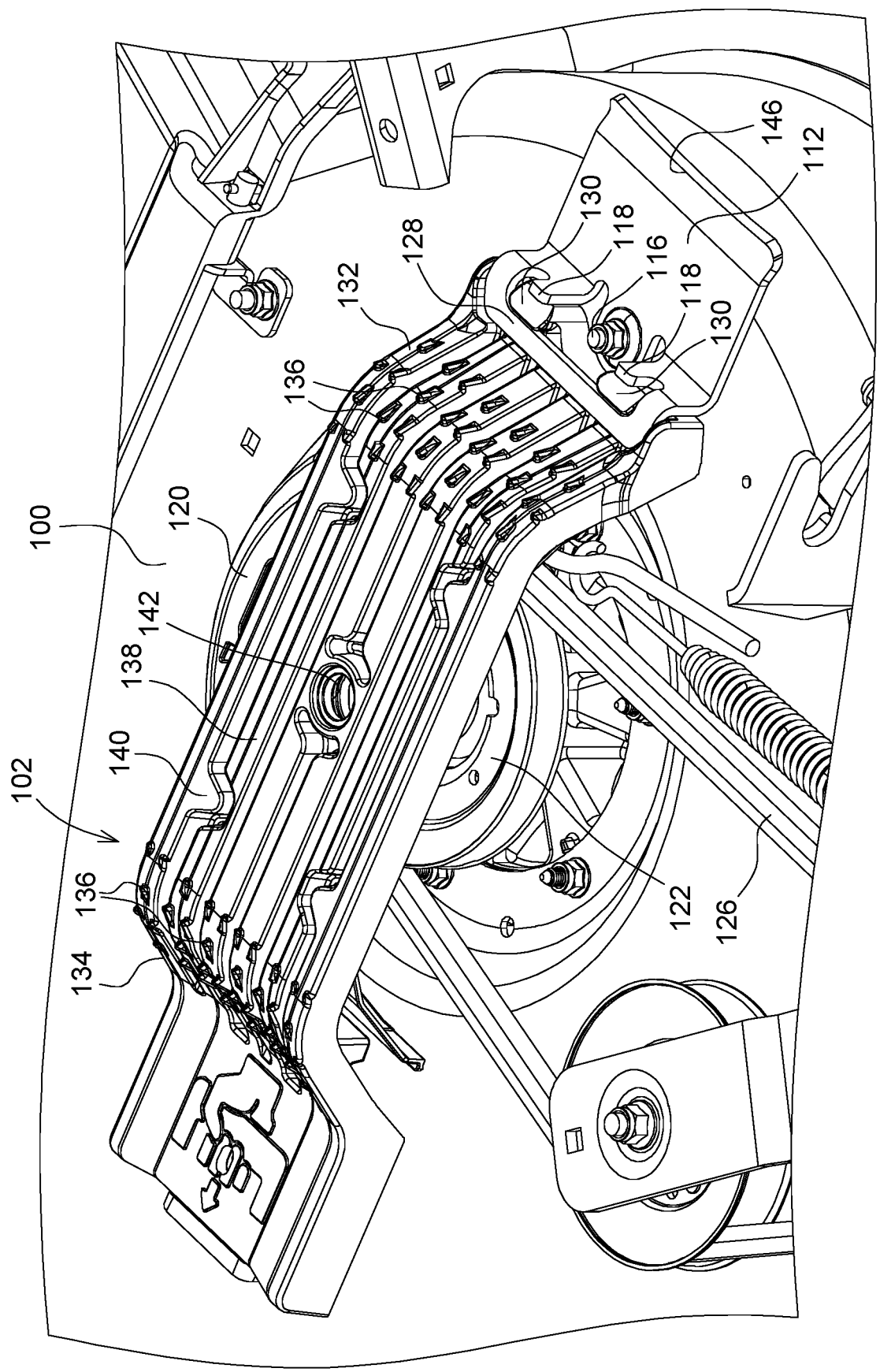
FIG. 2 is a top perspective view of a quick remove drive-over mower deck ramp on a mower deck according to a first embodiment of the invention.
Figure 3:
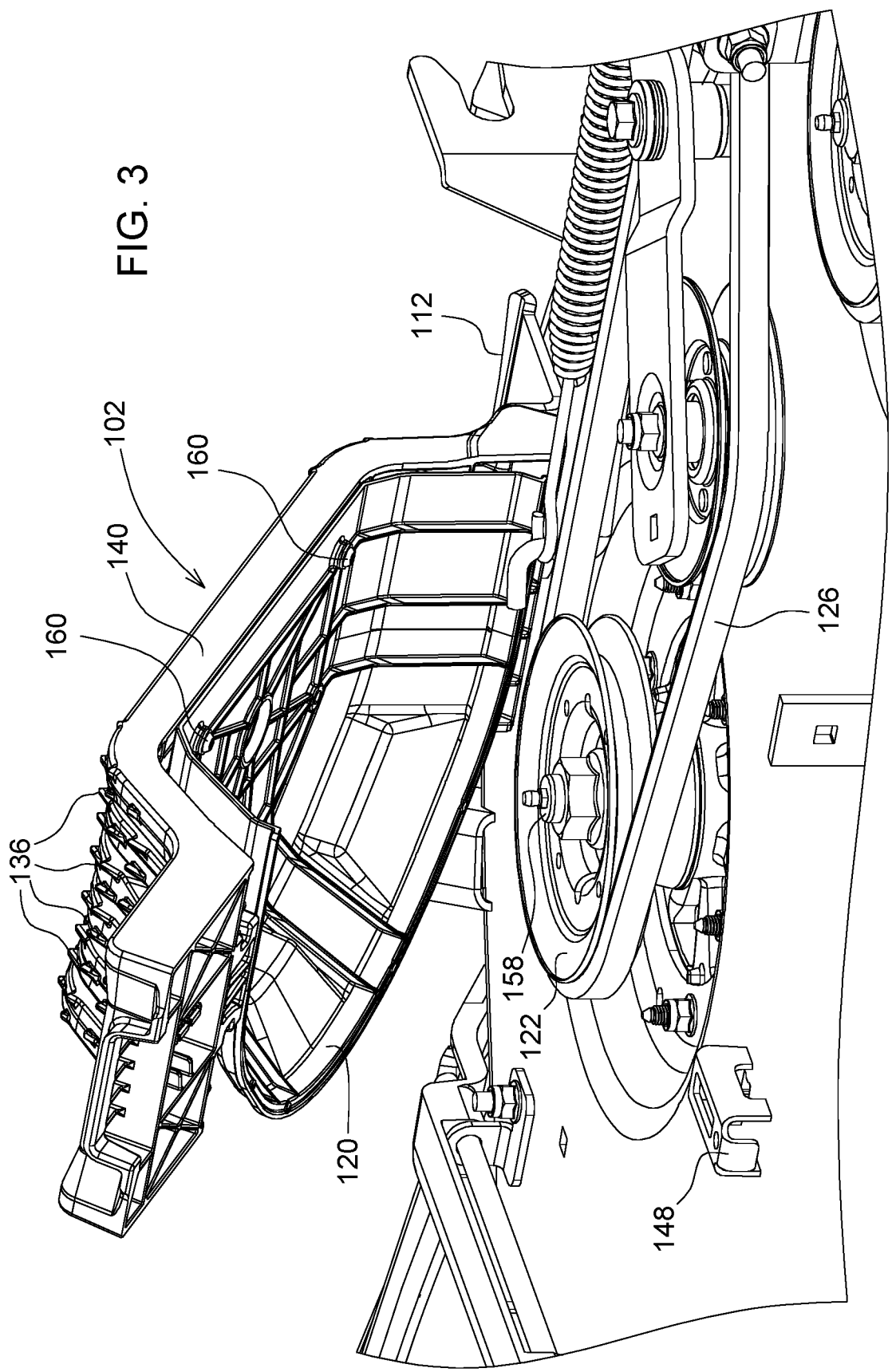
FIG. 3 is a perspective view of a quick remove drive-over mower deck ramp during installation or removal from a mower deck according to a first embodiment of the invention.
Figure 4:
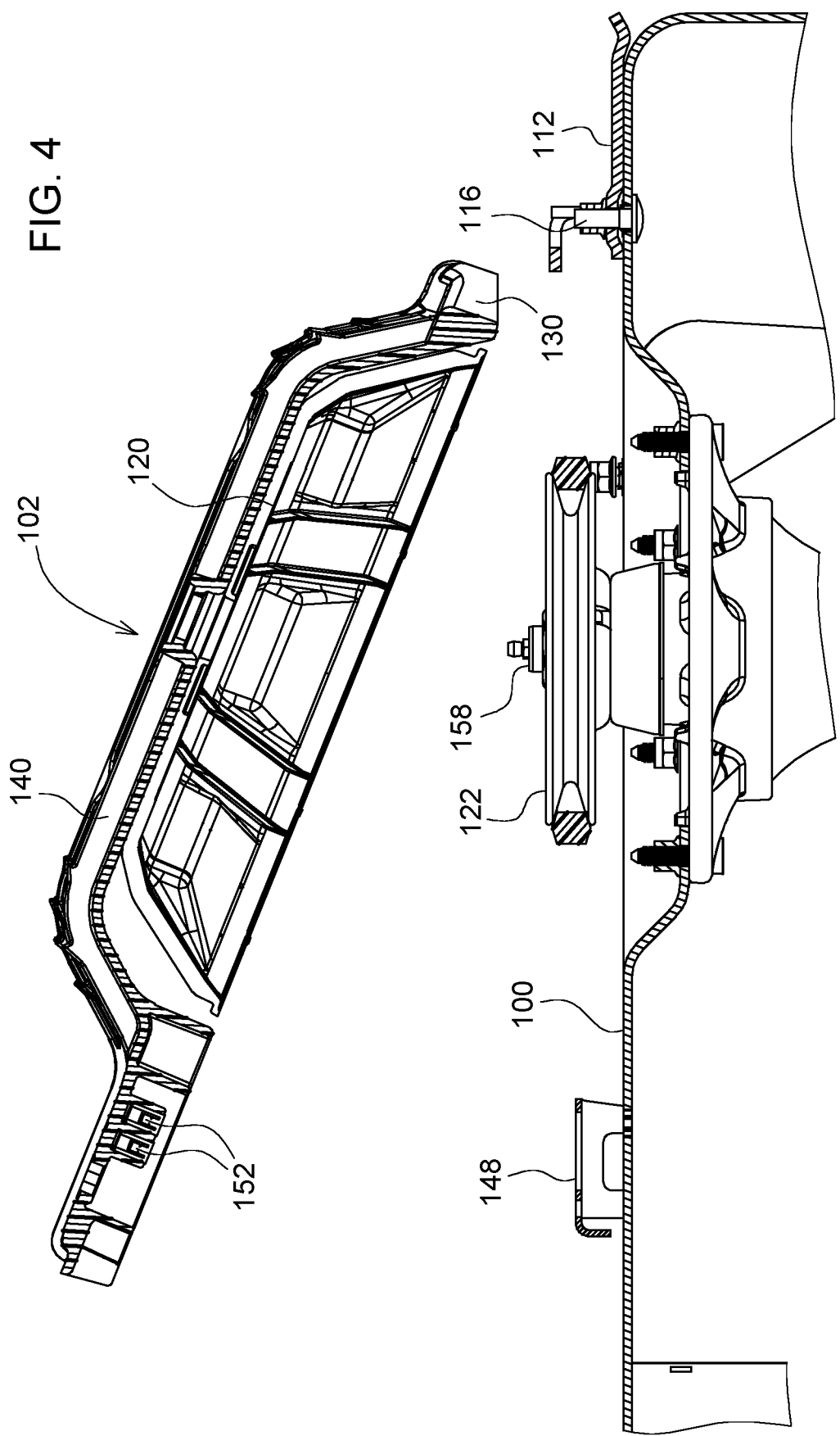
FIG. 4 is a side view, partially in section, of a quick remove drive-over mower deck ramp that is removed from a mower deck according to a first embodiment of the invention.
Figure 5:
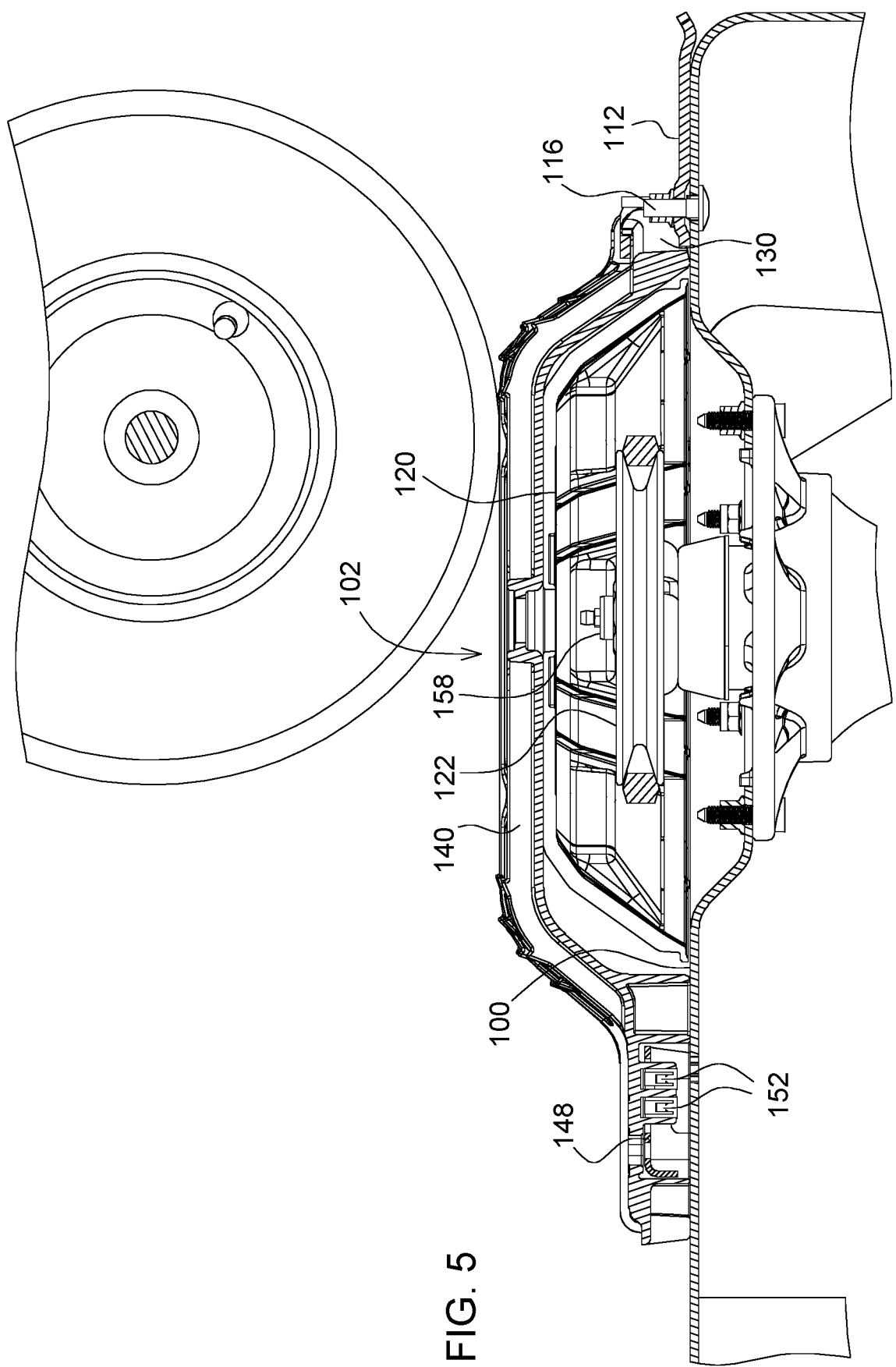
FIG. 5 is a side view, partially in section, of a tractor tire on a quick remove drive-over mower deck ramp according to a first embodiment of the invention.

As shown in FIGS. 1-5, in one embodiment, mower deck 100 may cover a plurality of rotary cutting blades mounted on the lower ends of vertically oriented blade spindles. A pair of quick remove drive-over mower deck ramps 102 may be mounted to the top surface of the mower deck. A tractor or other vehicle may drive over the mower deck, with the tires on the pair of quick remove drive-over mower deck ramps. The tractor or other vehicle may use the ramps to position the mower deck between the front and rear wheels for mowing, or to discontinue use of the mower deck. Each quick remove drive-over mower deck ramp 102 may include a one-piece plastic body, and preferably an injection molded glass-filled plastic structure.

In one embodiment, each quick remove drive-over mower deck ramp 102 may be disengaged and removed manually from the mower deck without tools. For example, at least one end of the ramp may be manually engaged and disengaged from the deck using a manual latching device, which may be one or more spring biased clips 152. The operator may move the clips into engagement with bracket 148 by pushing the end of the ramp down against the mower deck. The operator may disengage the clips from the bracket by reaching his fingers into a recess at the forward end of the ramp and pressing against the clips while lifting and/or pivoting the end of the ramp up from the mower deck.

In one embodiment, each quick remove drive-over mower deck ramp 102 may be pivotable between an engaged position on the mower deck and a disengaged position where the ramp may be removed from the mower deck. For example, at least one end of the ramp may have one or more tabs 130 that pivotably engage rear cleat 112. Rear cleat 112 may be attached to the top surface of the mower deck with threaded fastener 116. Rear cleat 112 may include tab retaining loop 128. Tab retaining loop 128 may capture and secure tabs 130 to hold the ramp in the engaged position, while the ramp is flat against or generally horizontal on the top surface of the mower deck. The operator may place the ramp in the engaged position by positioning the tabs under the tab retaining loop and pivoting the ramp down toward the top surface of the mower deck. Tab retaining loop 128 may release tabs 130 to disengage the ramp from the mower deck, by pivoting the ramp relative to the mower deck. For example, once the operator disengages clips 152, the operator may pivot the ramp up from the mower deck to an angle of between about 30 degrees and about 60 degrees away from the deck top surface, to remove the ramp.

In one embodiment, each quick remove drive-over mower deck ramp 102 may be attached to the mower deck with at least one cleat 112 having one or more tire gripping features. For example, cleat 112 may have tire gripping protrusions 118 projecting upwardly from the surface of the cleat. Additionally, cleat 112 may have a tire-gripping rear edge 146 extending rearwardly past the top surface of the mower deck, which the tractor tire may contact before or at the same time as the mower deck.

In one embodiment, each quick remove drive-over mower deck ramp 102 may have a rear incline 132 and a front incline 134, each incline sloping upwardly from the rear end or forward end of the ramp toward the center portion 140 or top surface of the ramp. The rear incline and front incline each may have tire gripping features 136 molded into the plastic structure. For example, the tire gripping features may include multiple barb-shaped projections having "shark fin" shapes. Additionally, the center or top surface 140 of the ramp may have multiple grooves or slots 138.

In one embodiment, each quick remove drive-over mower deck ramp 102 may be attached to spindle cover 120. The spindle cover may at least partially cover a spindle pocket, to shield and protect pulley 122 mounted on spindle 158, and also to protect belt 126. Spindle cover 120 may be attached to ramp 102 instead of to the mower deck. Alternatively, the spindle cover and ramp may be single component. As a result, the operator remove the ramp and spindle cover from the mower deck together, by pivoting the ramp relative to the mower deck. For example, spindle cover 120 may be attached to ramp 102 with snap fasteners 160 that may be integral with the ramp or spindle cover. Opening 142 may extend through the center portion of the ramp and spindle cover to spindle 158. With the ramp and spindle cover in the disengaged position, or completely removed from the mower deck, the operator may clean out grass clippings and debris that collects in the spindle pocket, grease the spindle bearings, or remove or replace the belt. No tool such as a wrench or socket is required to pivot the ramp and spindle cover up or down or disengage them from the mower deck.

Having described the preferred embodiment, it will become apparent that various modifications can be made without departing from the scope of the invention as defined in the accompanying claims.

The invention claimed is:

1. A quick remove drive-over mower deck ramp comprising:
   a one-piece plastic body having a first sloping end, a second sloping end, and a center portion between the first and second sloping ends supporting a vehicle tire driving over a pulley and belt on a multi-blade mower deck; and
   the first and the second sloping ends attached to a top surface of the multi-blade mower deck without tools by inserting the first sloping end into a retaining loop on a cleat mounted to the mower deck; the cleat having at least one tire gripping feature; and
   pivoting the one-piece plastic body over the pulley and belt until a spring biased clip on the second sloping end engages a bracket on the top surface of the mower deck.

2. The quick remove drive-over mower deck ramp of claim 1 further comprising a plurality of tire grabbing protrusions on at least one of the front sloping end and the rear sloping end.

3. The quick remove drive-over mower deck ramp of claim 1 further comprising a spindle cover attached to the ramp and removable with the ramp from the mower deck.

4. A quick remove drive-over mower deck ramp, comprising:
   a one-piece plastic body on a top surface of a mower deck for supporting a vehicle tire above at least one pulley mounted to the mower deck for rotating a mower blade;
   the one-piece plastic body having a front sloping surface and a rear sloping surface each sloping surface engaging only the top of the mower deck, each sloping surface having a plurality of tire gripping features;
   a tab on one of the front and the rear sloping surfaces that is insertable into a tab retaining loop on a cleat attached to the mower deck and removable from the tab retaining loop by pivoting the plastic body over the at least one pulley mounted to the mower deck;
   and a spring biased clip on the other of the front and the rear sloping surfaces that is insertable into a bracket on the mower deck and removable from the bracket by pressing against the clip.

5. The quick remove drive-over mower deck ramp of claim 4 wherein the cleat has at least one tire gripping feature.

6. The quick remove drive-over mower deck ramp of claim 4 further comprising a plurality of grooves in the plastic body.

7. A quick remove drive-over mower deck ramp comprising:
   a one-piece plastic body having a front incline, a center portion and a rear incline; the plastic body supported only by a top surface of a multi-blade mower deck and extending over a spindle on the multi-blade mower deck for supporting a vehicle driving over the mower deck and the spindle; and
   a tire gripping cleat having a loop engaging a tab extending from one of the inclines that is releasable by pivoting the one-piece plastic body over the mower deck and the spindle;
   a bracket releasably engaging a spring biased clip on the other of the inclines.

8. The quick remove drive-over mower deck ramp of claim 7 further comprising a plurality of tire gripping features on the front incline and the rear incline of the plastic body.

* * * * *